(12) United States Patent
Schagen et al.

(10) Patent No.: US 8,516,622 B2
(45) Date of Patent: Aug. 27, 2013

(54) SANITARY SYSTEM FOR A VEHICLE INCLUDING A REMOVABLE HOLDING TANK

(75) Inventors: Frank Schagen, Breda (NL); Sander Dijkhoff, Delft (NL); Marjan Van Breugel, Zwijndrecht (NL); Thomas Cornille, Farmington, MI (US)

(73) Assignee: Thetford Corporation, Ann Arbor, MI (US)

( * ) Notice: Subject to any disclaimer, the term of this patent is extended or adjusted under 35 U.S.C. 154(b) by 1402 days.

(21) Appl. No.: 11/745,638

(22) Filed: May 8, 2007

(65) Prior Publication Data

US 2007/0256221 A1 Nov. 8, 2007

Related U.S. Application Data

(60) Provisional application No. 60/798,796, filed on May 8, 2006, provisional application No. 60/840,057, filed on Aug. 24, 2006.

(51) Int. Cl.
*E03D 1/00* (2006.01)

(52) U.S. Cl.
USPC .................................................. 4/321; 4/323

(58) Field of Classification Search
USPC ...................... 4/321–323, 471–478
See application file for complete search history.

(56) References Cited

U.S. PATENT DOCUMENTS

| | | | | |
|---|---|---|---|---|
| 3,713,177 A | * | 1/1973 | Tufts et al. | 4/320 |
| 3,972,811 A | | 8/1976 | Larkins, Jr. et al. | |
| 4,694,975 A | * | 9/1987 | Hagan | 222/1 |
| 4,776,631 A | | 10/1988 | Sargent et al. | |
| 4,892,349 A | | 1/1990 | Sargent | |
| 5,031,249 A | * | 7/1991 | Sargent | 4/321 |
| 5,293,651 A | * | 3/1994 | Johansson | 4/420 |
| 5,318,275 A | | 6/1994 | Sargent et al. | |
| 5,369,811 A | * | 12/1994 | Serre | 4/213 |
| 6,189,161 B1 | | 2/2001 | Rijn et al. | |
| 2003/0033664 A1 | | 2/2003 | Grech | |
| 2003/0207088 A1 | | 11/2003 | Inoue et al. | |
| 2004/0148687 A1 | | 8/2004 | Lutz | |

FOREIGN PATENT DOCUMENTS

| | | |
|---|---|---|
| DE | 19705536 A1 | 8/1998 |
| DE | 9422285 | 9/1999 |
| EP | 0872603 A2 | 10/1998 |
| EP | 1464542 A2 | 10/2004 |
| WO | WO-2004065704 A1 | 8/2004 |
| WO | WO-2006002256 A2 | 1/2006 |

* cited by examiner

*Primary Examiner* — Huyen Le
*Assistant Examiner* — Erin Deery
(74) *Attorney, Agent, or Firm* — Harness, Dickey & Pierce, P.L.C.

(57) ABSTRACT

A sanitary system for a motor vehicle includes a bowl assembly, a base coupled to the bowl assembly and a mobile holding tank removably coupled to the toilet for receiving waste from the toilet and stowable within a storage area defined by the base. The sanitary system further includes a pumping arrangement having a first portion carried by the base and a cooperating second portion carried by the mobile holding tank. The first portion engages the second portion when the mobile holding tank is positioned within the storage area so as to define a fluid path from the mobile holding tank to a remote waste storage tank for pumping of waste from the mobile holding tank to the remote waste storage tank.

20 Claims, 11 Drawing Sheets

SANITARY SYSTEM FOR A VEHICLE INCLUDING A REMOVABLE HOLDING TANK

CROSS-REFERENCE TO RELATED APPLICATIONS

This application claims priority to U.S. Provisional Patent Application No. 60/798,796 filed 8 May 2006 and U.S. Provisional Patent Application No. 60/840,057 filed 24 Aug. 2006, which applications are herein expressly incorporated by reference.

FIELD

The present teachings relates generally to sanitary systems for use in vehicles. More particularly, the present teachings relate to a sanitary system for a vehicle having a removable holding tank.

BACKGROUND

Vehicles, including but not limited to recreational vehicles ("RVs" in the United States and "Caravans" in Europe), tractor trailers, airplanes, boats, trains, and the like, often incorporate sanitation systems for the comfort and convenience of the occupants. In one particular type of known sanitation systems, a removable waste holding tank is adapted for use with a toilet positioned within an interior compartment of a recreational vehicle. Waste is transported by the toilet structure to the holding tank where it is stored. The holding tank can be conveniently removed from the recreational vehicle through an exterior access door and then transported to a waste disposal site for emptying.

To enable the holding tank to accept waste products from the toilet of the sanitary system, a waste holding tank of the above mentioned type generally includes a centrally disposed fill opening located within its top wall. A seal element surrounds the fill opening of the tank and includes an upper portion which seals against an outlet opening of the toilet bowl. So constructed, waste can be easily and sanitarily transferred into the holding tank.

U.S. Pat. Nos. 4,776,631; 4,892,349; 5,031,249; 5,318,275; and 6,189,161, all owned by the assignee of this application, show examples of the self-contained toilet systems of the type including a waste receptacle having a downwardly directed outlet opening and a storage compartment defined and located below the outlet opening along with a waste holding tank removably disposed within the storage compartment. These systems enable the vehicle operator to remove the holding tank from the vehicle through a small door in a wall of the vehicle. U.S. Pat. Nos. 4,776,631; 4,892,349; 5,031,249; 5,318,275; and 6,189,161 are each incorporated by reference as if fully set forth herein.

Waste disposal systems utilizing a removable holding tank have been in extensive use for more than ten years. These systems, such as those described in U.S. Pat. Nos. 4,776,631; 4,892,349; 5,031,249; 5,318,275; and 6,189,161, have proven to be effective and convenient, and have resultantly become popular in the marketplace. Since manufacture of sanitary systems of this type is typically not within the province of RV builders, an entirely self-contained system can be shipped from the sanitary system manufacturer to the RV builder and essentially all that the RV builder has to do is provide a space in which to mount it. In other words, the RV builder does not have to go to the trouble of separately mounting a toilet bowl on the floor, mounting a waste tank under the floor, connecting it to the toilet bowl outlet, or attaching the usual conduits and termination valves to the outside of the holding tank.

Despite the commercial success achieved by known sanitary systems, a need for continuous improvement in the pertinent art remains.

SUMMARY

In one particular form, the present teachings provide a sanitary system for a motor vehicle having a toilet, a base, a mobile holding tank and a pumping arrangement. The toilet is coupled to the base. The mobile holding tank is removably coupled to the toilet for receiving waste from the toilet and is stowable within a storage area defined by the base. The pumping arrangement includes a first portion carried by the base and a cooperating second portion carried by the mobile holding tank. The first portion engages the second portion when the mobile holding tank is positioned within the storage area so as to define a fluid path from the mobile holding tank to a remote waste storage tank for pumping of waste from the mobile holding tank to the remote waste storage tank.

In another particular form, the present teachings provide a control panel for a sanitation system. The control panel includes a printed circuit board and an overlay. The overlay covers the printed circuit board and includes a substrate. The overlay further includes a plurality of control symbols printed on a back side of the substrate and one or more layers of semi-transparent ink applied to a front side of the substrate. The one or more layers of semi-transparent ink are sufficiently opaque to normally hide the plurality of control symbols until backlighting is provided to the plurality of control symbols.

In yet another particular form, the present invention provides a venting arrangement for a holding tank of a sanitary system. The venting arrangement includes a fluid path extending between the holding tank and the atmosphere. A tube defines a portion of the fluid path. The tube has a first end coupled to the holding tank. A fan is positioned in the fluid path. The fan is operative to draw odors from the holding tank. A filter is positioned in the fluid path between the tube and the fan for absorbing odors.

DRAWINGS

The present teachings will become more fully understood from the detailed description and the accompanying drawings, wherein.

DESCRIPTION OF VARIOUS ASPECTS

The following description is merely exemplary in nature and is in no way intended to limit the invention, its application, or uses.

With reference generally to the drawings, a sanitation system according to the present teachings is illustrated and generally identified at reference character 10. In one application, the sanitation system 10 may be used in a motor vehicle. The present teachings, however, have application to other uses.

The sanitation system 10 is illustrated to generally include a bowl assembly 12, a base 14 and a removable holding tank 16. The base 14 and the bowl assembly 12 may be built into a vehicle in any manner well known in the art. Reference in this regard may be made to commonly assigned U.S. Pat. No. 4,776,631, for example. The holding tank 16 is removably stowed within a storage compartment defined by the base 14.

The bowl assembly 12 defines a bowl 18. An associated seat 20 and cover 22 are hingedly mounted on bowl 18 in a conventional manner. Operation of the valve-blade (not shown) which closes an outfall beneath the bowl assembly 12 may be electronically or mechanically controlled. The particular manner of control is beyond the scope of the present teachings.

The holding tank 16 has a generally overall rectangular shape. A top wall defines an opening which is opened and closed by a valve blade (not shown) within the tank 16. When the tank 16 is stowed within the stowage compartment of the base 14, the opening registers in a sealed manner with the outlet from bowl 18, and the blade controls the passage from the bowl 18 into the holding tank 16. The holding tank opening automatically connects to and disconnects from the toilet bowl outlet in response to movement of the holding tank 16 into and out of the stowage compartment of the base 14. Further details concerning the operation of the blade of the system 10 are generally beyond the scope of the present teachings and are sufficiently described in commonly assigned U.S. Pat. No. 4,776,631 referenced above.

As described in commonly assigned U.S. Pat. No. 4,776,631, the holding tank 16 may be removed from the remainder of the system 10 for emptying. For example, the holding tank 16 may be removed through an exterior access door of a recreational vehicle or caravan. In this manner, the holding tank 16 may easily and quickly be removed for emptying.

Figure 3:
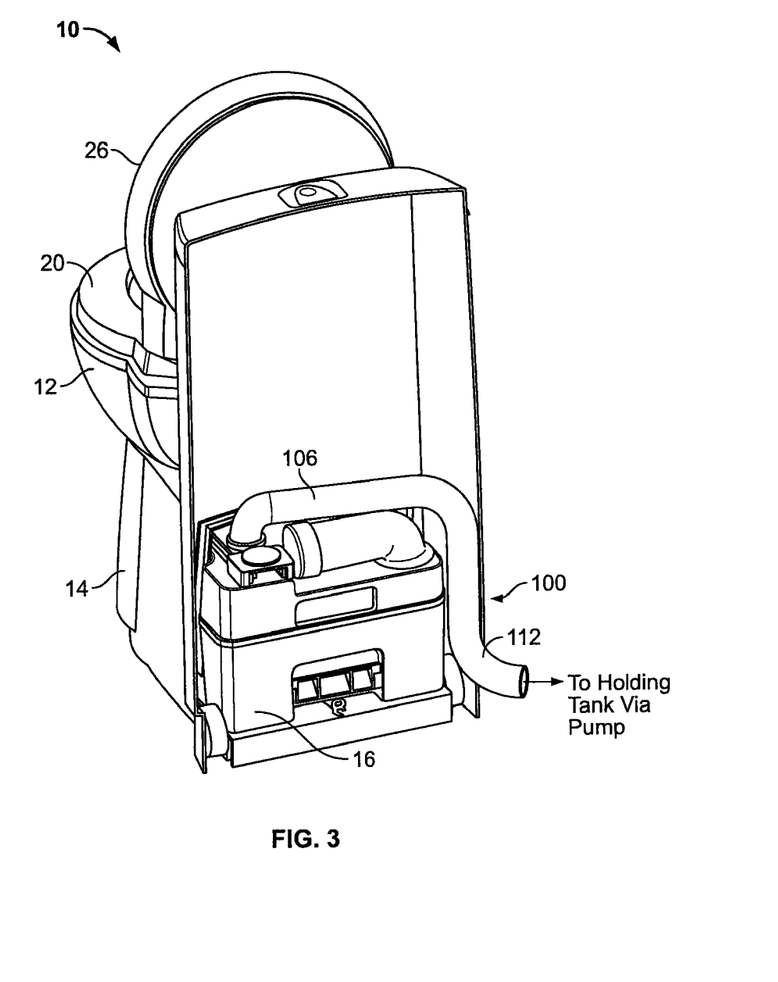
FIG. 3 is another rear perspective view of the sanitary system for a motor vehicle of the present teachings.

The system 10 may additional include a pumping arrangement 100 (see FIG. 3, for example) for the pumping of waste from the holding tank 16. Through the incorporation of such an arrangement, the frequency of removing the holding tank 16 for emptying or cleaning may be significantly reduced. In this regard and in the manner to be addressed herein, the waste from the holding tank 16 may be pumped from the holding tank 16 to an on-board holding tank (not particularly shown) or a sewage system (not particularly shown).

Figure 4:
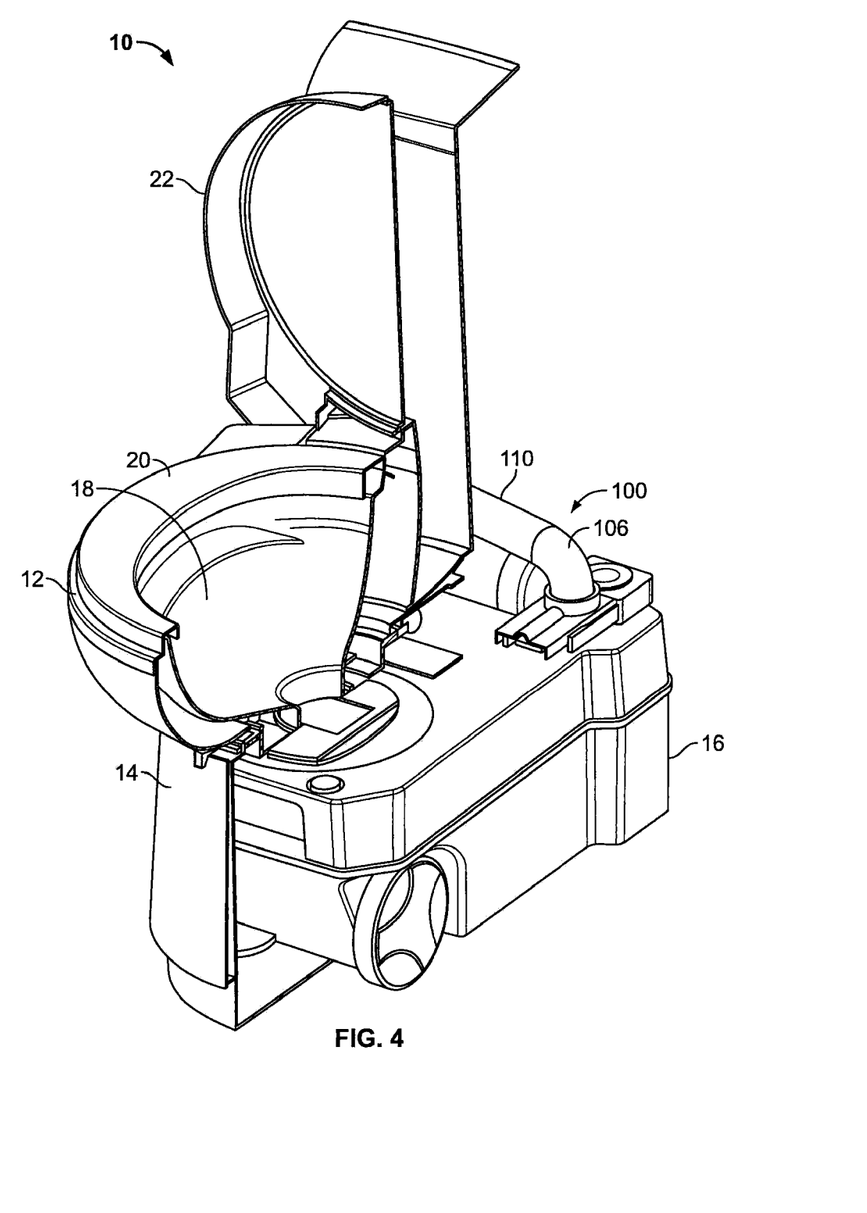
FIG. 4 is another front perspective view of the sanitary system for a motor vehicle of the present teachings, the toilet again shown cut-away for purposes of illustration.
Figure 5:
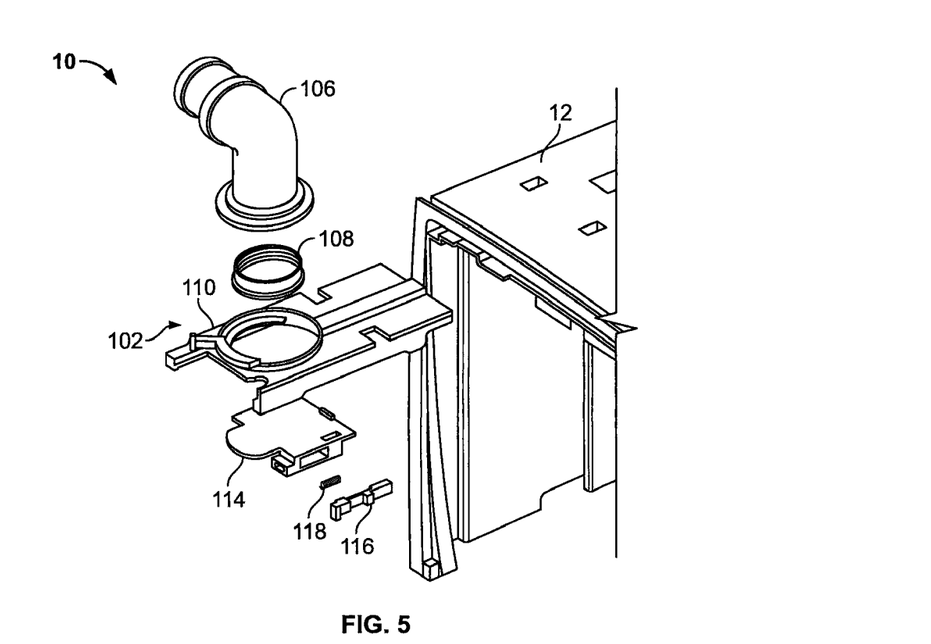
FIG. 5 is an exploded, perspective view of a portion of a sanitary system for a motor vehicle.
Figure 6:
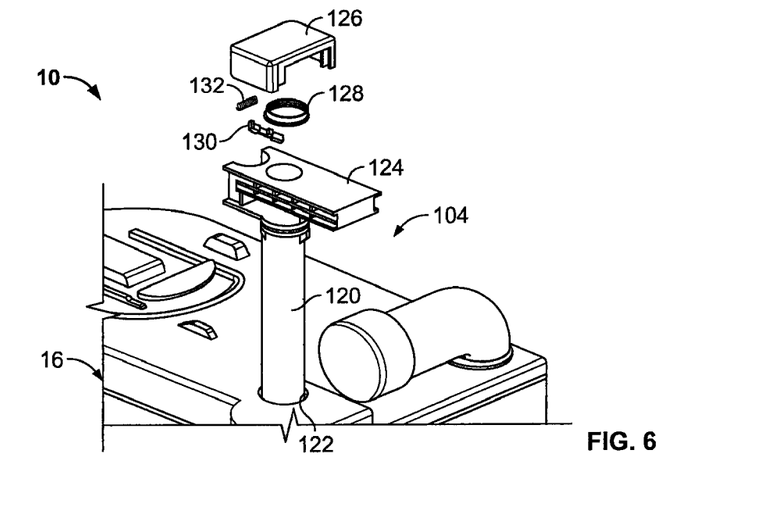
FIG. 6 is another exploded, perspective view of a portion of a sanitary system for a motor vehicle.

With particular reference to FIG. 4 and the exploded views of FIGS. 5 and 6, the pumping arrangement 100 may generally include a base assembly 102 and a cooperating holding tank assembly 104. The base assembly 102 may be carried by the base 14 of the sanitation system 10 and may include a tube connection 106 and seal 108 carried by a plate 110. The plate 110 may be secured to the base 14 of the system 10 in any conventional manner. In one application, the plate 110 may be secured with a pair of screws (not shown). The seal 108 provides a water-tight connection. The tube connection 106 may be coupled at one end to the plate 110 for rotation about a generally vertically extending axis. At its other end, the tube connection 106 may be coupled to a flexible tubing 112 which in turn is connected to a remote holding tank through a pump.

The plate 110 may slidably support a cover 114. The cover 114 selectively opens an aperture 115 defined by the plate 110. The aperture provides fluid communication with the tube connection 106. A retaining member or clicker 116 is biased by a spring 118 to normally retain the cover 114 in a closed position. Various other known mechanisms may be employed for retaining the plate 114 in a closed position.

Figure 1:
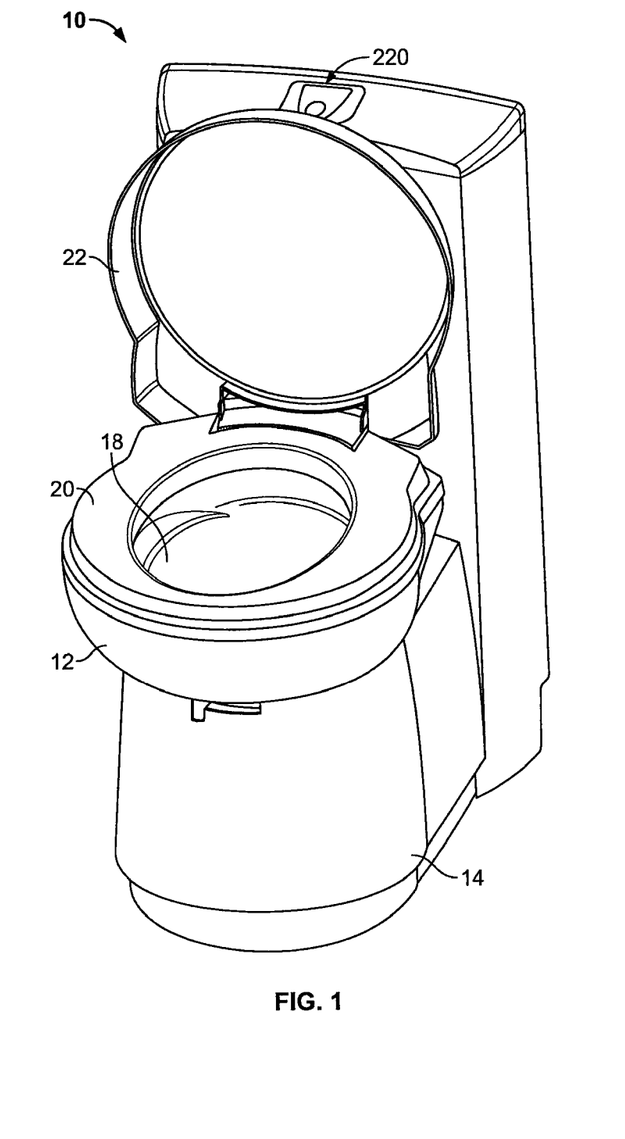
FIG. 1 is a front perspective view of a sanitary system for a motor vehicle constructed in accordance with the present teachings.
Figure 2:
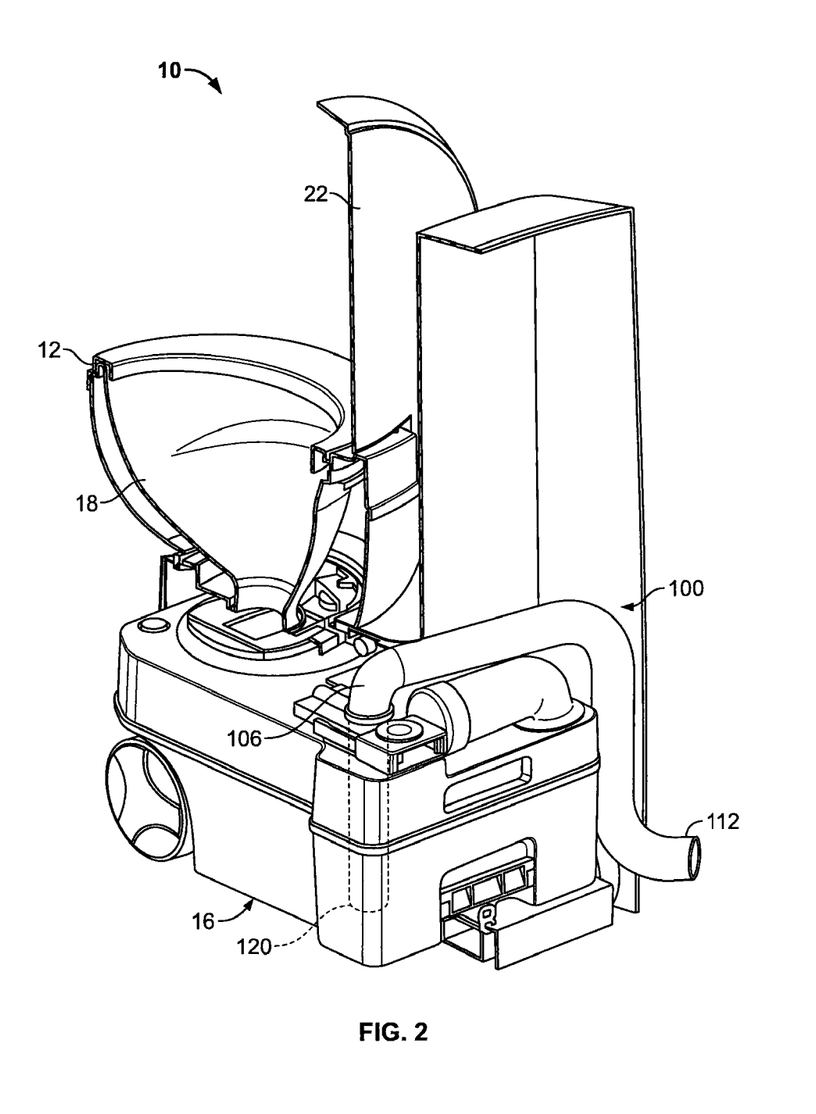
FIG. 2 is a rear perspective view of the sanitary system for a motor vehicle of the present teachings, a toilet of the system shown cut-away for purposes of illustration.

The cooperating holding tank assembly 104 may include a tube 120. As shown in broken lines in FIG. 2, the tube 120 may extend down into the holding tank 16 through an opening 122. An o-ring may provide a fluid-tight seal with the holding tank 16. The tube 120 may include a receiving member 124 at an upper end thereof. As discussed below, the plate 110 and the receiving member 124 are adapted to slidably couple together. A cover 126 is slidably received by the receiving member 124. In this regard, the receiving member 124 and cover 126 may include cooperating flanges or other structure that permits sliding movement of the cover 126 relative to the receiving member. The cover 126 selectively opens an upper end of the tube 120. The o-ring 108 may provide a fluid-tight seal with the cover 126. A retaining member or clicker 130 is based by a spring 132 to normally retain the cover 126 in a closed position. Again, various other known mechanisms may be employed for retaining the cover 126 in a closed position.

Figure 7A:
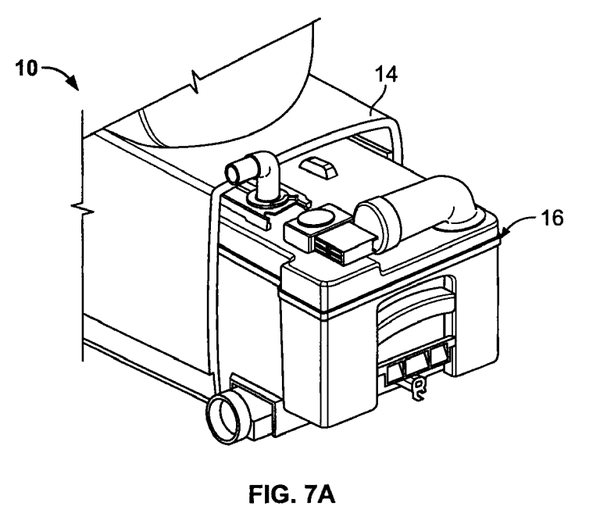
FIGS. 7A-7C represent a series of views illustrating insertion of the removable holding tank of the present teachings.
Figure 7B:
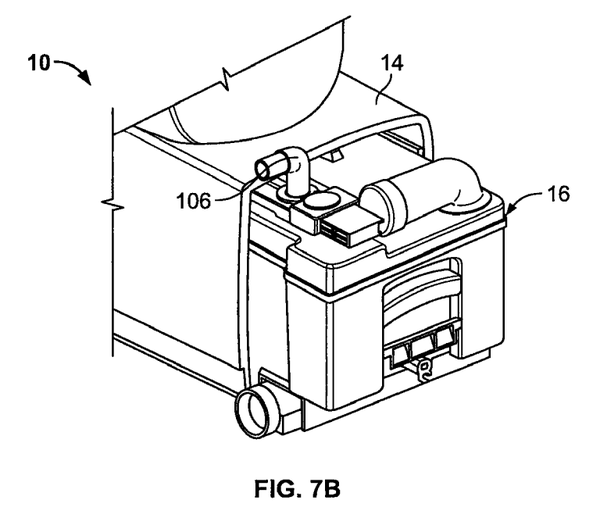
Figure 7C:
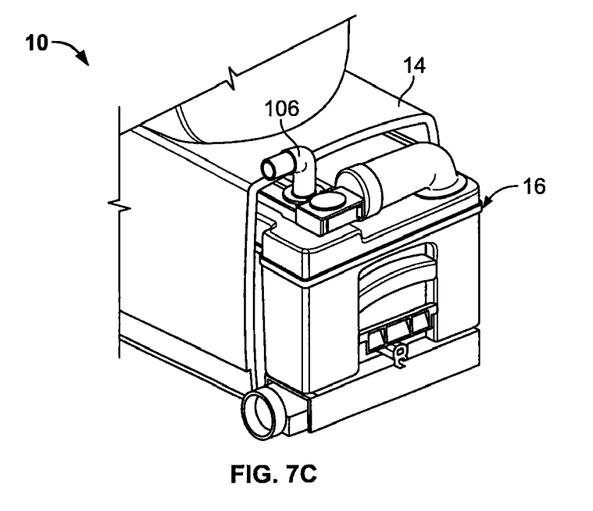
Figure 8:
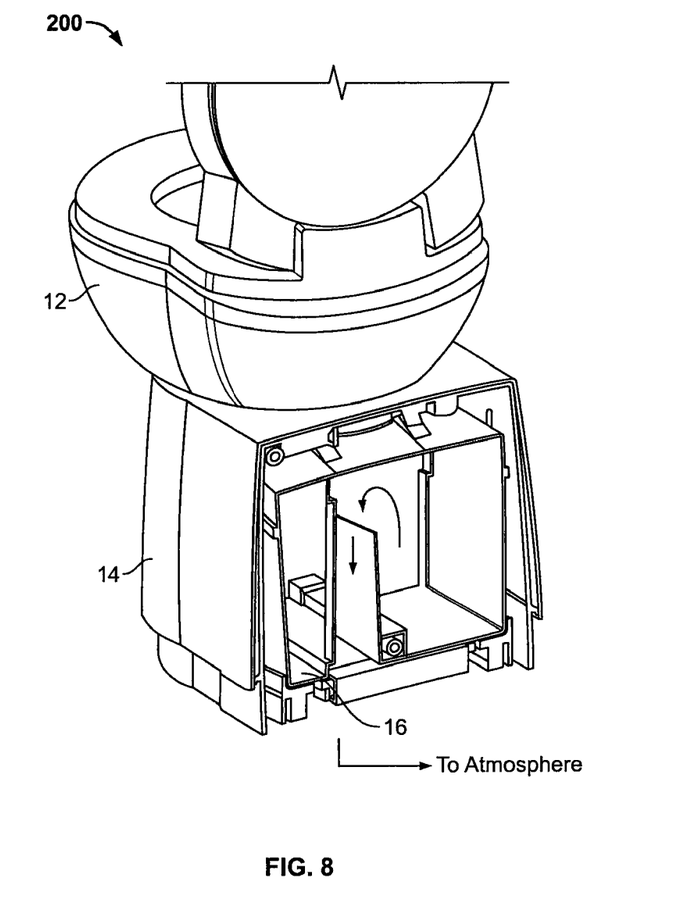
FIG. 8 is another rear perspective view of the sanitation system in accordance with the present teachings, the sanitation system shown partially cut-away for purposes of illustration.

The general operation of the system 10 as it relates to the pumping arrangement 100 will be described with particular reference to FIGS. 7A through 7C. In FIG. 7A, the holding tank 16 is inserted into the storage chamber defined by the base 14. In FIG. 7B, the holding tank 16 is further inserted and the plate 110 and the receiving member 124 align and are ready for coupling. In FIG. 7C, the holding tank 16 is fully connected. The spring loaded clickers 116 and 130 ensures that the covers 114 and 126 only move when the holding tank 16 is installed or removed. Upon installation (see FIG. 7C) the covers 114 and 126 translate to respectively open the aperture of the plate 110 and the upper end of the tube 120. When the tube 112 is attached to the tube connection 106, a fluid path is established between the removable holding tank 16 and the remote holding tank of the vehicle, for example.

With particular reference to FIGS. 8 through 11 the sanitation system 10 may generally include a venting arrangement 200 for the venting of holding tank fumes. The venting arrangement 200 defines a path between the removable holding tank 16 and atmosphere outside the vehicle. In a manner described in more detail in U.S. Pat. No. 7,032,255, the flexible tube 202 leads at least partly through the interior of the holding tank 16 without being in fluid communication with the interior of the holding tank 16. Arrows are provided in FIG. 8 to generally indicate the direction of flow. U.S. Pat. No. 7,032,255 is hereby incorporated by reference as if fully set forth herein.

Odors may be drawn out of the holding tank 16 with a fan 204. The fan 204 may be positioned within a recess 206 defined in a lower base portion 208 of the housing 14. A filter 210 may be disposed between an end of the flexible tube 202 and the fan 204. Similar to the fan 204, the filter 210 may be disposed in the recess 206 of the lower base portion 208. The filter 210 may comprise a box-like structure constructed of cardboard or other similar disposable material. The filter 210 may define a fluid path between an upper opening 212 and a lower opening 214. An odor absorbing media such as charcoal may be disposed in the fluid path between the upper opening 212 and the lower opening 214. The filter 210 may be quickly and easily replaced.

Figure 9:
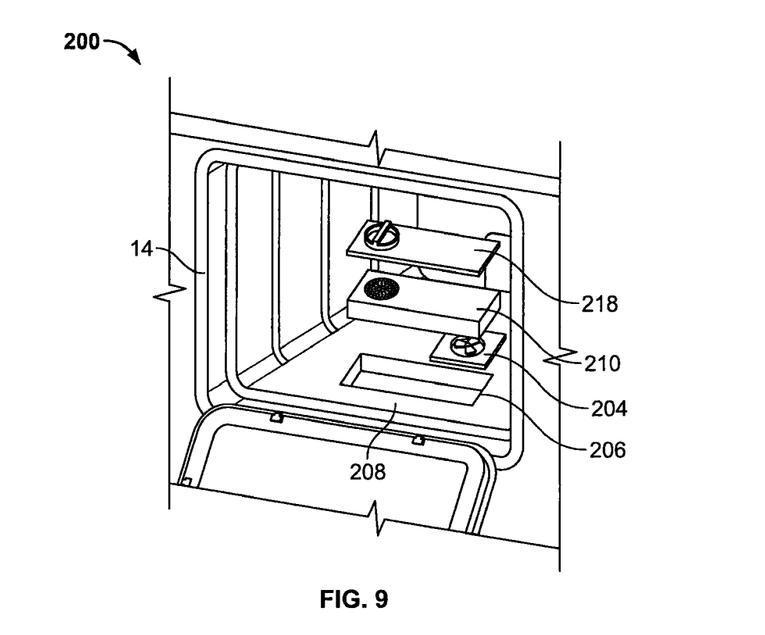
FIG. 9 is a partially exploded view of the sanitation system in accordance with the present teachings, the holding tank removed from the system for purposes of illustration.
Figure 10:
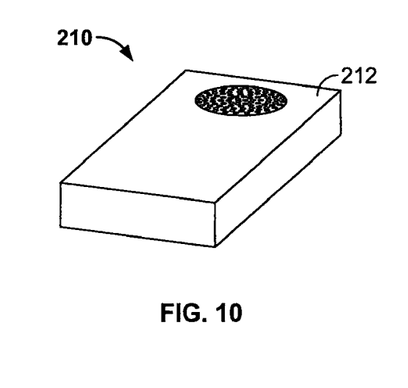
FIG. 10 is a perspective view of the filter of the sanitation system in accordance with the present teachings.
Figure 11:
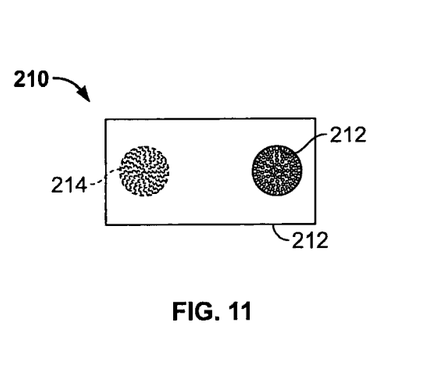
FIG. 11 is a top view of the filter of FIG. 10.

The recess 206 of the lower base portion 208 may be covered with a plate 218. The plate 218 may define an opening 220 for directly engaging the flexible tube 202. Removal of the plate 218 facilitates the quick and easy removal and replacement of the filter 210. Such removal and replacement of the filter 210 need not require removal of the fan. Location of the fan 204 after the filter 210 may further function to minimize chemical corrosion by the gasses that pass through the fan 204.

Figure 12:
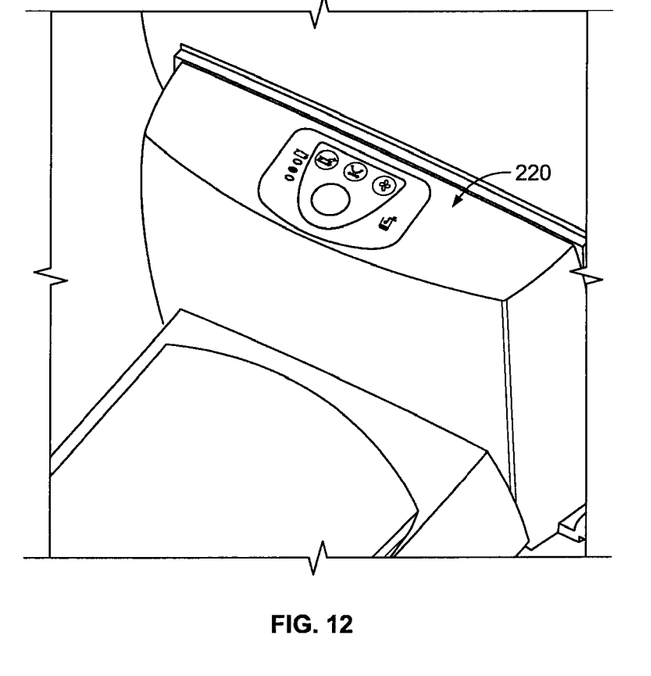
FIG. 12 is a front perspective view of a portion of the sanitation system in accordance with the present teachings, the sanitation system illustrated to include a control panel for electronically controlling various functions of the sanitation system, an enlarged view of the control panel in a quiet state shown in an inset.
Figure 13:
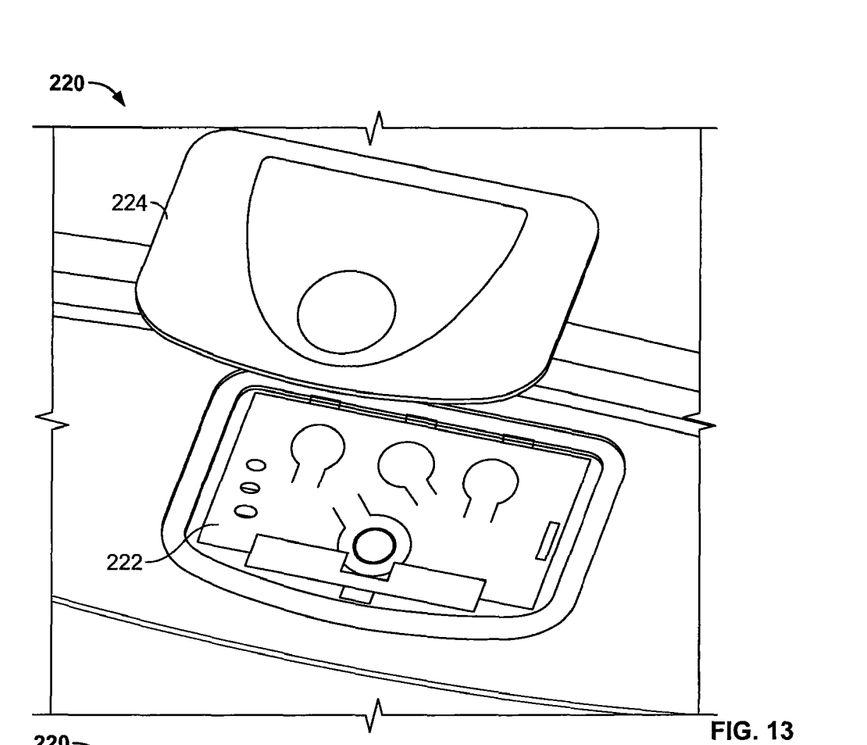
FIG. 13 is a perspective view of a portion of the sanitation system in accordance with the present teachings, an overlay of the control panel shown exploded from the remainder of the control panel for purposes of illustration.

The sanitation system 200 may additionally include a control panel 220 for electronically controlling various functions of the toilet 12. One exemplary location for the control panel 220 on the toilet 12 is shown in FIG. 12. It will be understood that other locations may be employed within the scope of the present teachings. For example, the control panel 220 may be located remotely from the toilet 12.

In one particular application, the control panel 220 may be operative to control features such as flushing, waste transfer from the holding tank, blade actuation, the fan 204. The control panel 220 may also provide visual indicators for water tank level, holding tank level and the like. It will be understood that button control of features such as flushing, waste transfer from the holding tank 16, blade actuation and fan control are generally conventional insofar as the present teachings are concerned. Similarly, control panel indicators for water tank level and holding tank level are conventional insofar as the present teachings are concerned.

Figure 14:
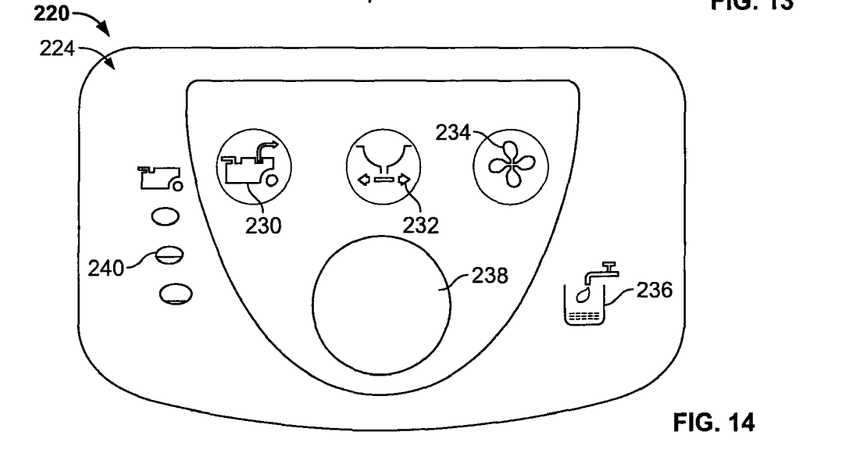
FIG. 14 is an enlarged front view of the overlay of the sanitation system in accordance with the present teachings, the overlay shown in a fully active state.

The control panel 220 may generally include a printed circuit board (PCB) 222 and an overlay 224. The overlay 224 may include an adhesive layer and may be placed over the PCB 222 to seal the PCB 222 from moisture and other contaminants. As will be discussed, the overlay 224 may function to allow the control panel 220 to operate in a quiet state and an active state. The quiet state is shown in FIG. 12, for example. The active state is shown in FIG. 14, for example.

Figure 15:
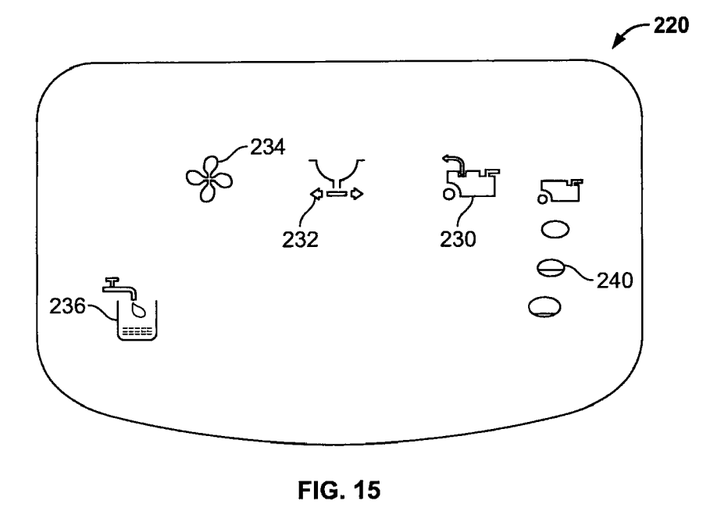
FIG. 15 is an enlarged rear view of the overlay of the sanitation system in accordance with the present teachings.

The overlay 224 may be formed of a plastic substrate and may include various symbols printed on the back of the substrate. A reverse side of the overlay 224 is shown in FIG. 15. The various symbols may include, for example, a waste transfer button icon 230, an electronic blade button icon 232, a fan button icon 234, a water tank level indicator 236, and a holding tank indicators 240. A front side of the substrate may be printed with one or more layers of semi-transparent ink. A flush button indicator 238 may be printed over the one or more layers of semi-transparent ink. The one or more layers of semi-transparent ink are sufficiently opaque that the symbols printed on the back of the substrate are not visible without backlighting. Such backlighting for selectively illuminating the various symbols may be provided on the PCB 222. Circles around the icons 230, 232 and 234 in FIG. 14 indicate illumination of these icons.

The control panel 220 normally operates in a quiet state (see FIG. 12, for example) in which only the flush button icon is visible (e.g., no back lit illumination). In this manner, none of the backlights of the PCB 222 is illuminated and the remaining symbols are hidden. By hiding the remaining symbols, the appearance of the control panel 220 is simplified for users that may not be completely familiar with vehicle toilets. Furthermore, hiding of the remaining symbols removes an unnecessary temptation to push the other controls. By hiding symbols selectively, only one overlay 224 needs to be produced for use with sanitary systems having different features (e.g., fan, electric blade, waste transfer) installed. In this manner, only features installed are backlit on the PCB 22 and visible on the overlay 224.

Before using the toilet 12, the user activates the toilet 12 by pushing the flush button icon 238. This action activates the fan 204. Visual feedback is provided through the overlay 224 by a flashing symbol. A timer automatically shuts off the fan after a predetermined period (e.g., five minutes).

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

The description of the present teachings are merely exemplary in nature and, thus, variations that do not depart from the gist of the invention are intended to be within the scope of the invention. Such variations are not to be regarded as a departure from the spirit and scope of the invention.

What is claimed is:

1. A sanitary system for a motor vehicle, the system comprising:
   a bowl assembly;
   a toilet base supporting the bowl assembly, the bowl assembly coupled to the toilet base;
   a mobile holding tank removably coupled to the bowl assembly for receiving waste from the bowl assembly and stowable within a storage area defined by the toilet base, the mobile holding tank including a top surface enclosing the mobile holding tank upon removal from the bowl assembly; and a pumping arrangement including a first portion carried by the toilet base and a cooperating second portion carried by the mobile holding tank, the first and second portions having cooperating structure for interconnecting together to define a fluid path from the mobile holding tank to a remote waste storage for the pumping of waste from the mobile holding tank;

wherein movement of the mobile holding tank into the storage area both automatically couples the mobile holding tank to the bowl assembly and automatically slidably engages the first portion with the second portion so as to define the fluid path from the mobile holding tank to a remote waste storage tank, and further wherein movement of the mobile holding tank out of the storage area both automatically decouples the mobile holding tank from the bowl assembly and decouples and the first portion from the second portion.

2. The sanitary system of claim 1, wherein the first portion defines a first aperture in fluid communication with the pumping arrangement and the second portion defines a second aperture in fluid communication with the mobile holding tank.

3. The sanitary system of claim 2, wherein the first and second apertures are closed prior to engagement between the first and second portions.

4. The sanitary system of claim 3, wherein at least one of the first and second apertures is associated with a cover for selectively covering the at least one of the first and second apertures.

5. The sanitary system of claim 4, wherein the cover is spring biased to a closed position.

6. The sanitary system of claim 1, wherein the holding tank is slidably received within the storage area.

7. The sanitary system of claim 6, wherein the holding tank is slidably received through a side opening in the toilet base.

8. The sanitary system of claim 1, wherein the holding tank is a self-contained tank upon removable coupling from the remainder of the sanitary system.

9. The sanitary system of claim 1, wherein the second portion is disposed at an end of a tube, the tube downwardly extending into the mobile holding tank.

10. The sanitary system for a motor vehicle of claim 9, wherein the first portion includes a first cover for selectively covering an opening leading to the hose coupling and the second portion includes a second cover for selectively covering an opening leading to a cavity defined by the mobile holding tank, the first and second covers spring biased to closed positions and movable to open positions only when the mobile holding tank is installed in the storage area.

11. The sanitary system of claim 1, wherein the first portion is coupled to a rotatable tube.

12. The sanitary system for a motor vehicle of claim 1, wherein the first portion includes a hose coupling proximate the top surface of the mobile holding tank when the mobile holding tank is in the storage area.

13. A sanitary system for a motor vehicle, the sanitary system comprising:
  a bowl assembly;
  a toilet base supporting the bowl assembly, the bowl assembly coupled to the toilet base;
  a self-contained, mobile holding tank for removable coupling to the bowl assembly for receiving waste from the bowl assembly, the holding tank slidably received within a storage area defined by the toilet base; and
  a pumping arrangement including a first portion carried by the toilet base and a cooperating second portion carried by the holding tank, the first and second portions having cooperating structure for interconnecting together to define a fluid path from the mobile holding tank to a remote waste storage for the pumping of waste from the mobile holding tank, the first and second portions adapted to slidably engage one another upon sliding introduction of the holding tank into the storage area and thereby establish the fluid path from the holding tank to the remote waste storage.

14. The sanitary system of claim 13, wherein the holding tank can be alternatively emptied by removing the holding tank from the remainder of the sanitation system.

15. The sanitary system of claim 13, wherein the second portion is disposed at an end of a tube, the tube downwardly extending into the mobile holding tank.

16. The sanitary system for a motor vehicle of claim 13, the mobile holding tank including a top surface enclosing the mobile holding tank upon removal from the bowl assembly, the mobile holding tank automatically coupled to and disconnected from the bowl assembly in response to movement of the holding tank into and out of the storage area, respectively.

17. The sanitary system for a motor vehicle of claim 13, wherein the first portion includes a hose coupling proximate a top surface of the mobile holding tank when the mobile holding tank is in the storage area.

18. The sanitary system for a motor vehicle of claim 17, wherein the first portion includes a first cover for selectively covering an opening leading to the hose coupling and the second portion includes a second cover for selectively covering an opening leading to a cavity defined by the mobile holding tank, the first and second covers spring biased to closed positions and movable to open positions only when the mobile holding tank is installed in the storage area.

19. A sanitary system for a motor vehicle, the system comprising:
  a bowl assembly;
  a toilet base supporting the bowl assembly, the bowl assembly coupled to the toilet base and defining a storage area;
  a self-contained, mobile holding tank removably coupled to the bowl assembly for receiving waste from the bowl assembly and stowable within the storage area, the mobile holding tank including a top surface enclosing the mobile holding tank upon removal from the bowl assembly, the mobile holding tank automatically coupled to and disconnected from the bowl assembly in response to movement of the holding tank into and out of the storage area, respectively; and
  a pumping arrangement including a first portion and a cooperating second portion, the first and second portions having cooperating structure for interconnecting together to define a fluid path from the mobile holding tank to a remote waste storage for the pumping of waste from the mobile holding tank, the first portion coupled to the base and defining an aperture, the second portion slidably receiving the first portion as the mobile holding tank is positioned within the storage area, the second portion coupled to a tube, the tube downwardly extending into the mobile holding tank, the tube adapted to align with the aperture so as to define fluid path from the mobile holding tank to a remote waste storage.

20. The sanitary system of claim 19, wherein the tube is rotatably connected to the second portion.

* * * * *